July 15, 1969  D. H. MARTINI ET AL  3,455,467
PLOW FEEDER SYSTEM FOR SELF-UNLOADING VESSEL
Filed Sept. 11, 1967  2 Sheets-Sheet 1
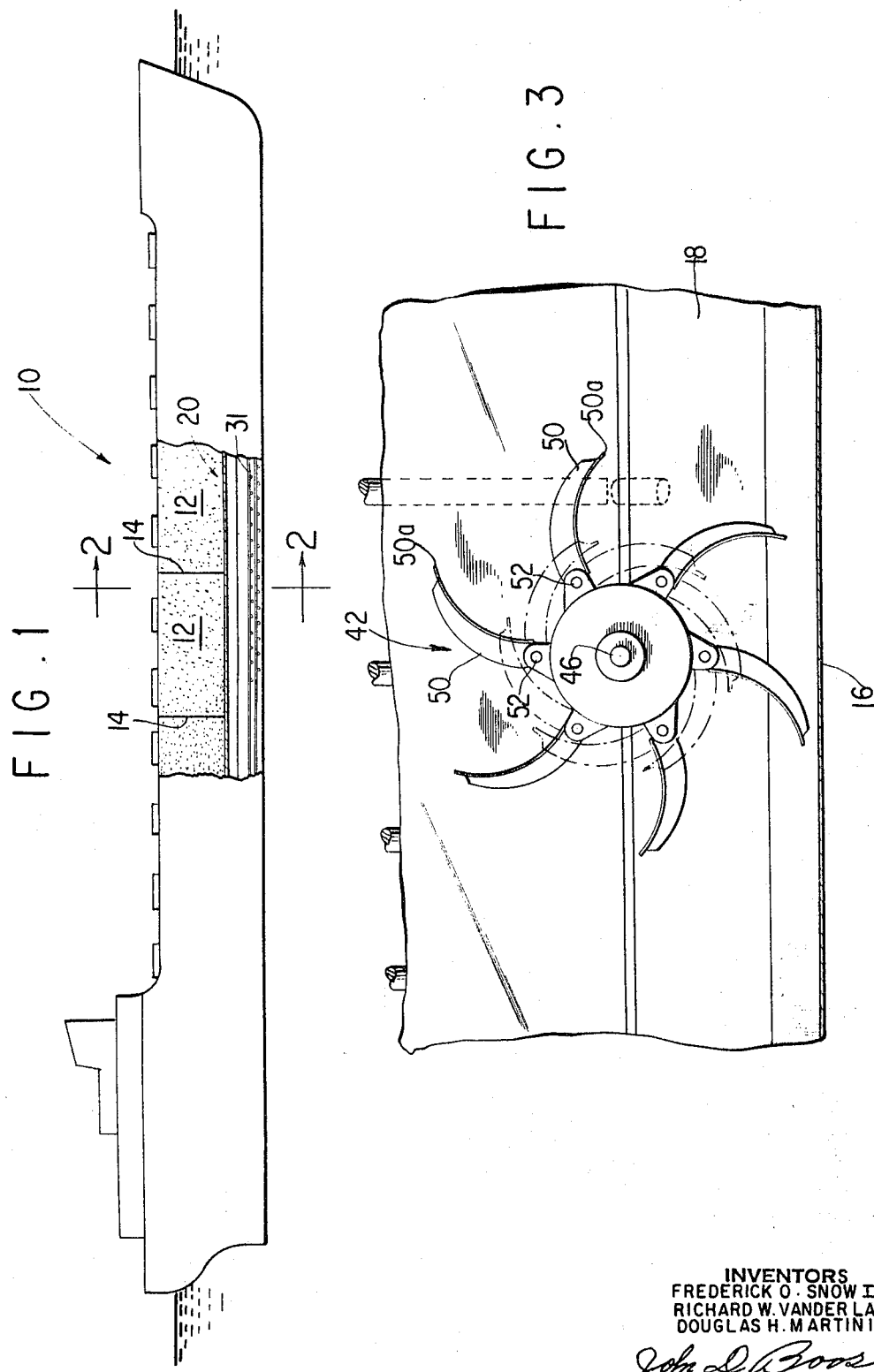
INVENTORS
FREDERICK O. SNOW III,
RICHARD W. VANDER LAAN
DOUGLAS H. MARTINI
ATTORNEY

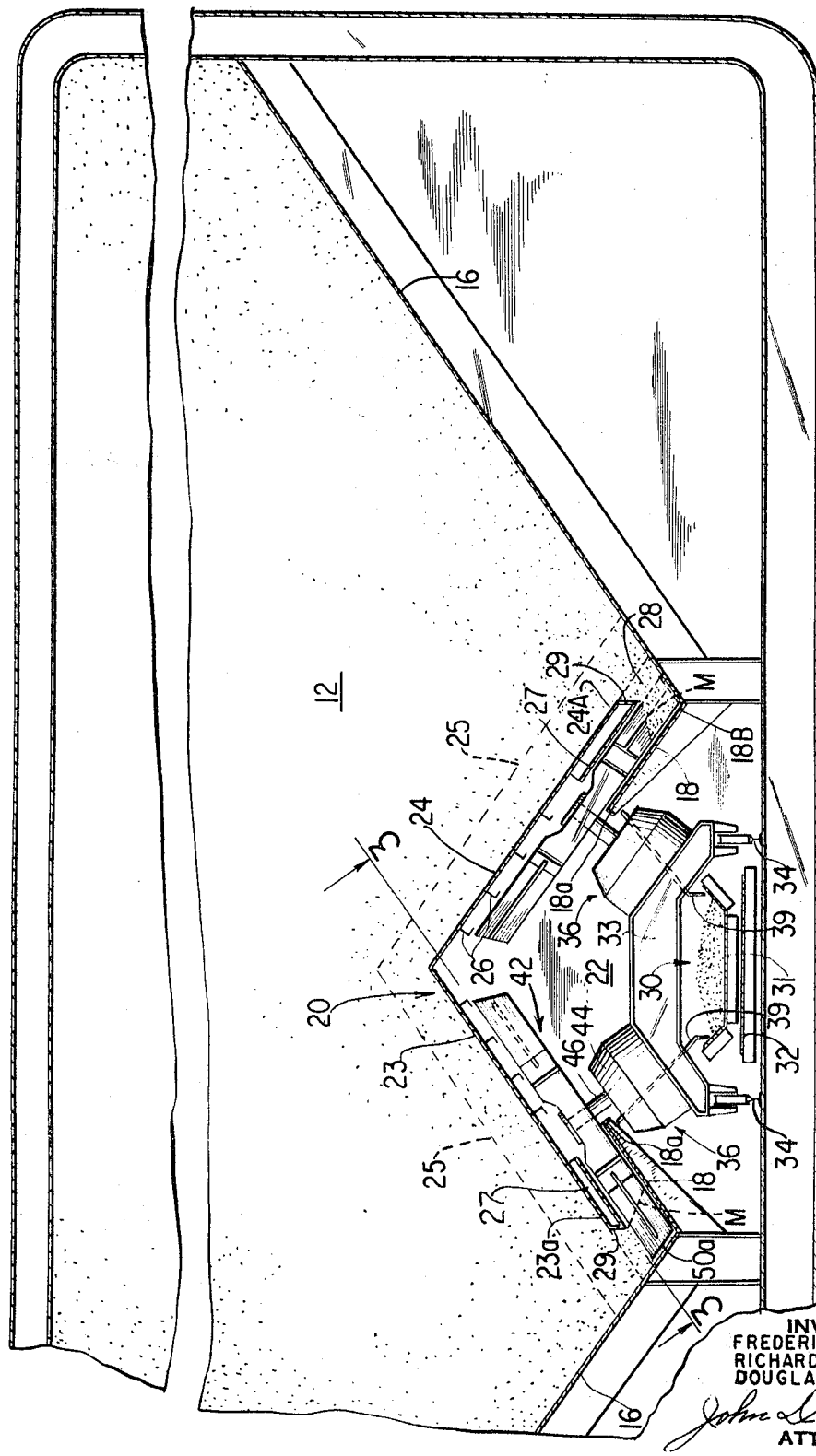

United States Patent Office 3,455,467
Patented July 15, 1969

3,455,467
PLOW FEEDER SYSTEM FOR SELF-UNLOADING VESSEL
Douglas H. Martini, Chatham, Frederick O. Snow III, Wayne, and Richard W. Vander Laan, Pompton Lakes, N.J., assignors to Hewitt-Robins Incorporated, Stamford, Conn.
Filed Sept. 11, 1967, Ser. No. 666,736
Int. Cl. B63b 27/22; B65g 67/58
U.S. Cl. 214—15                                  8 Claims

ABSTRACT OF THE DISCLOSURE

This application relates to a discharge system for loading bulk material onto a discharge conveyor at the bottom of a self-unloading vessel. In its simplest concept, the system has a cargo hold which is designed so as to deposit material stored therein onto at least one inclined storage shelf extending substantially the entire length of the hold. A rotary plow feeder is positioned in the bottom of the vessel and is adapted to traverse back and forth along the length of the shelf while reclaiming material from the storage shelf and depositing it on the discharge conveyor.

BACKGROUND OF THE INVENTION

Self-unloading cargo vessels carrying bulk materials are frequently designed with the hull of the vessel partitioned into a number of cargo holds which are essentially large storage hoppers. Located at the bottom of these storage hoppers are a series of hopper gates which open over one or more unloading conveyors. When the hopper gates are opened the bulk material stored in the hoppers is discharged past the hopper gates onto one or more conveyors. The material is then conveyed to additional equipment which transfers the material to a location outside the vessel.

A major problem has heretofore been the controlling of the discharge rate of the bulk material onto the discharge conveyor in such a manner that the vessel will rise on a relatively even keel with a minimum amount of ballast required. The conventional gate system is usually operated by opening one or two of the series of gates over each conveyor and thereby allowing the material to be discharged at, or near, the maximum flow rate. This type of rapid discharge requires careful surveillance in order to insure that the shifting weight distribution caused by discharging the cargo from only one area in the vessel will not cause the vessel to heel in a particular direction. Furthermore, since each of these gates must be operated independently, a separate actuating mechanism or control means must be employed for each gate which is usually located near each gate. This results in an expensive system which requires operating personnel to be stationed in the conveyor tunnel or tunnels to operate the gates during the time required to discharge the cargo.

Still a further problem has been that the bulk material, which may be compacted during transit, tends to "bridge" over the openings of the conventional hopper gates or, in other words, the bulk material will form itself into a self supporting arch over the hopper gate opening and thereby prevent the material stored above the arch from being discharged. In addition, this conventional hopper gate system requires the use of skirt boards extending the length of the cargo hold on either side of, and in contact with, the conveyor belt in order to direct the material from the bottom of the storage hoppers to the conveyors and to minimize spillage. These skirtboards require that sufficient horsepower be provided in the conveyor drive machinery so as to overcome the frictional forces created between the skirtboards and conveyor belt.

THE SUMMARY OF THE INVENTION

The above described problems are overcome in the present invention by entirely eliminating the conventional hopper gate. In the present invention the bottom of the cargo storage holds are formed with slot-type openings extending longitudinally along the length of the cargo hold which permit the material stored in the storage holds to be discharged into trough-like receivers formed below these openings. A rotary plow feeder is then adapted to travel between the receivers while plowing the material from the receivers onto the discharge conveyor.

Accordingly, one object of the present invention is to provide an automatic discharge system for continuously loading discharge conveyors in self-unloading vessels.

Another object is to provide a unique hopper design which is adapted to be continuously unloaded by a rotary plow feeder.

Still another object of this invention is to provide a gateless hopper design in a self-unloading vessel which is adapted to be unloaded by a rotary plow feeder.

A further object is to provide a rotary plow feeder in the bottom of a self-unloading vessel and which feeder has two rotary plow mechanisms for reclaiming material off of two inclined storage shelves at the bottom of the vessel storage area.

DESCRIPTION OF THE DRAWINGS

Other objects, advantages and novel features of the present invention will become apparent from the following detailed description of the invention when considered in conjunction with the drawings wherein:

FIG. 1 is a side view of a self-unloading vessel incorporating the present invention with parts broken away.
FIG. 2 is a view taken along line 2—2 of FIG. 1.
FIG. 3 is a view taken along line 3—3 of FIG. 2.

DESCRIPTION OF DETAILED EMBODIMENT

Referring now to FIG. 1, there is illustrated a typical self-unloading vessel 10 having a storage area made up of a series of cargo holds 12 formed between bulkheads 14 and sidewalls 16. As seen in the cross-sectional view, FIG. 2, the sidewalls of each cargo hold or storage hopper incline downwardly toward the bottom of the vessel. An upwardly inclined storage shelf 18 is formed along the bottom of each of the hopper sidewalls. These two storage shelves are continuous and extend for substantially the entire length of the storage area. The upper edges 18a of the shelves are spaced apart so as to define a horizontal slot type opening which also extends substantially the entire length of the storage area. Formed over the storage shelves 18 and over the horizontal slot type opening is a double pitched roof 20 which forms a longitudinal tunnel 22 at the bottom of the cargo holds. The roof is made up of flat inclined roof sections 23, 24 supported by spaced apart rafters 25 and reinforced by structural members 26. The lower sections 23a, 24a of each of the sloping roof sections located immediately over the storage shelves can be made with a doubled walled construction, if desired, by providing cover strip plates 27 coupled to members 26 and by end strips 29 which seal the lowermost edges of the roof section. These cover strip plates serve as a cover means, as will hereinafter be described, so as to insure efficient operation of the rotary plow feeders. Each inclined roof section 23, 24 is substantially parallel to the storage shelf and is spaced from the sloping sidewalls of the cargo hold so as to define an inclined slot-type opening 28 extending along the entire length of the storage area. These slots enable the bulk material stored in the cargo hold to enter the tunnel 22 and come to rest on the storage shelves. The size of these inclined slot openings and the width of the storage shelves are so related to the natural angle of repose of the stored bulk material that the material enters tunnel 22 and comes to rest on the storage shelves as a sloping pile of material as indicated at M. The slots 28 are interrupted by the spaced rafters 25, however, these rafters do not substantially inhibit the stored material from being gravity fed into the trough-like receivers formed by the junction of the shelves 18 to the bottom sections of the sidewalls 16.

The angle of storage shelf incline, the perpendicular height of the roof section above the storage shelf, and the distance from the lower edge of the roof sections to the sidewalls of the storage hopper are design parameters arrived at from considering such factors as the type of bulk materials to be handled (i.e., their natural angles of repose), the designed discharge rate, the desired cubic capacity of the cargo holds, the space available, and the maximum amount of roll which the vessel is likely to experience. While these parameters may be varied, it should be noted that it is critical that the storage shelves be designed so as to retain or hold back the shifting bulk material during maximum roll of the self-unloading vessel about the vessel's longitudinal axis. Thus, the storage shelves must be designed to support and hold back the bulk material when the vessel is vertical and when the vessel has rolled in either direction about its longitudinal axis to the maximum degree anticipated. It is, therefore, necessary to upwardly incline the storage shelves and to also have the width of the shelf (i.e., the distance from the bottom 18b of the shelf to the upper edge 18a) selected so that the material stored in the cargo hold will initially come to rest on the shelf at a substantial distance from the shelf edge when the vessel is in a vertical position. The term "substantial distance" is here employed to signify a difference from the conventional statationary rotary plow feeder system where the storage shelf is designed so that piled material is located relatively close to the storage shelf edge. It will be recognized that after the ship has rolled about its longitudinal axis, as would normally occur when traveling from one port to another, the material stored on the shelf may shift to a position relatively close to the shelf edge, as in staitonary plow feeder systems, but it will not shift over the edge of the shelf.

Located below the horizontal slot type opening is a conventional discharge conveyor 30 having a conveying reach 31 and a return reach 32. A carriage 33 straddles the conveying reach 31 and is mounted for traveling on spaced parallel rails 34. Any conventional means, such as motorized drive wheels or a rope haulage drive, not shown, can be employed to drive the carriage in either a forward or reverse direction.

The carriage is constructed with guide chutes 39 opening over the discharge conveyor and has two rotary plow mechanisms mounted thereon. Each plow mechanism comprises a motor, not shown, which drives a rotor 42 through a reduction gear unit 44 and shaft 46. The plow mechanisms are positioned so that one rotor will reclaim the material from one of the inclined storage shelves and the second rotor will reclaim the material from the second storage shelf. In each case the plow blades of the rotor move between the storage shelf and the associated roof section and the rotor rotates in a plane which is substantially parallel to the storage shelf over which it is operating. The width of the plow blades is just slightly less than the perpendicular distance between the storage shelf and the covering roof section. In this manner the roof section serves as a covering means which prevents any material in the path of the rotating blades from falling back over the upper edges of the blades. It will be recognized that this covering means may be eliminated in those situations where such plow feeder inefficiencies may be tolerated without departing from the basic concept behind this invention. The ends 50a of the blades are angled, as shown in FIG. 2, so as to enable the blades to sweep in close proximity to the lower surface of the sloping sidewalls of the cargo hold.

The particular type of rotor employed in this design forms no part of the present invention, however, it should be noted that either the conventional fixed blade design or the pivotal blade design can be employed. The plow blades illustrated in the accompanying drawing are of the pivotal type described in U.S. patent application Ser. No. 625,186. As shown in FIG. 3, this pivotal design enables the plow blades 50 to be rotated about pins 52 in order that the blades may be folded around the hub into the dotted line position. In this folded position the carriage may be readily moved along the length of the conveyor without having the plow blades performing a reclaiming function and thereby permitting selective reclamation of the bulk material at any location along the length of the storage hopper. Means can also be provided for positively extending or retracting the pivotally mounted plow blades.

In operation, the rotors are rotated in a reclaiming direction while the carriage is slowly driven in either a forward or reverse direction along the length of the tunnel. The material reclaimed off the storage shelves falls through the guide chutes and onto the conveyor belt below. In normal operation, the carirage would continuously traverse the total length of the cargo hold in order to keep the vessel on an even keel during unloading and thereby reducing the ballast requirements. The speed of the rotors and the speed of the carriage is varied in accordance with the characteristics of the material handled and the desired discharge rate. As the material is reclaimed from the storage shelves, the material in the cargo hold flows by gravity into the tunnel and comes to rest on the storage shelf. There is thus a continuous gravity feed of material from the cargo hold onto the storage shelf as the material is undercut by the rotors and many of the problems with bridging that occurs in hoppers having the conventional hopper gates are thereby avoided.

It will be recognized that a rotary plow feeder system has been adapted for use in the bottom of a self-unloading vessel. This system permits the continuous transfer of stored bulk material from the cargo holds onto a discharge conveyor and enables all the cargo holds to be gradually unloaded together. There is, therefore, none of the stabilization problems (i.e., keeping the vessel on an even keel) which are present in vessels having a conventional gate-type hopper discharge system.

In summary, the inclined storage shelves in the present invention are necessary in order to adapt the plow feeder for use in a vessel in which there is a possibility of rolling about a longitudinal axis. The included storage shelves are specifically designed so as to have pile bulk material initially (i.e., when the material is first loaded into the vessel) located at a substantial distance from the edge of the shelves. Furthermore, the use of the inclined roof section as a cover means enables the use of the plow elements on an inclined surface with an increased reclaiming capacity.

While this specification described the preferred embodiment of one carriage having one rotary plow for each of two spaced storage shelves, it will be obvious that two or more rotary plows could be employed for each shelf and that two or more carriages could be employed in the tunnel at the same time. Likewise, the simplest form of this invention would entail having only one storage shelf at the bottom of the cargo hold and having a carriage with only a single rotary plow mechanism.

What is claimed is:

1. A self-unloading vessel having at least one bulk material cargo hold, said cargo hold being formed so as to define discharge openings at the bottom thereof which extend substantially the entire length of said cargo hold, upwardly inclined shelf means formed at the bottom of said cargo hold which extend continuously beneath the discharge openings of said cargo hold, said shelf means being positioned relative to the discharge openings in said cargo hold such that the material stored in the bottom of said cargo hold will normally pass through the discharge openings and initially come to rest on the lower end section of said shelf means at a distance from the upper edges of said shelf means which is sufficient to permit the vessel to roll about the vessel's longitudinal axis, within the design limits of the vessel, without causing shifting of material up over the upper edges of said shelf means, a conveying means positioned below said shelf means in material receiving relationship with the upper edge of said shelf means and plow means adapted to traverse substantially the entire length of said shelf means in order to plow the material from said shelf means onto said conveying means.

2. The combination described in claim 1 wherein said plow means comprises a carriage means that is movable substantially parallel to said shelf means, and a rotary plow mechanism having a rotor means rotatable in a plane which is substantially parallel to said shelf means, said rotor means being positioned so as to sweep over the upper surface of said shelf means in order to thereby reclaim the material from said shelf means and deposit it on said conveying means.

3. The combination described in claim 2 which is further characterized by a cover means which is substantially parallel to and directly over said shelf means, said cover means being spaced from said shelf means a distance which is slightly greater than the width of said rotor means, said rotor means being rotatable between said shelf means and said cover means whereby the material reclaimed by said rotor means is prevented from falling over the upper edge of said rotor means by said cover means.

4. The combination described in claim 1 wherein the discharge openings formed in said cargo hold are two spaced parallel openings which extend substantially the entire length of said cargo hold, said shelf means comprising an upwardly inclined shelf member formed at the bottom of said cargo hold for each of the parallel openings, each of said shelf members being located below and substantially coextensive with one of the parallel openings such that the material stored in the bottom of said cargo hold will normally pass through both of the parallel openings and come to rest on said shelf members, said plow means adapted to plow the material from each of said shelf members onto said conveyor means.

5. The combination described in claim 4 wherein said plow means comprises a carriage means that is movable along the entire length of said shelf means, a first and a second rotary plow mechanism mounted on the carriage, each of said mechanisms having rotatably driven motor means coupled thereto, said rotor means of said first mechanism being positioned so as to sweep over the upper surface of one of said shelf members and said rotor means of said second mechanism being positioned so as to sweep over the surface of the other said shelf member in order to thereby reclaim the materal from both of said shelf members and deposit it on said conveying means.

6. The combination described in claim 5 which is further characterized by a cover means formed over and substantially parallel to each of said shelf members, each of said cover means being spaced above said shelf members a distance which is slightly greater than the width of said rotor means, said rotor means being rotatable between said shelf members and said cover means, said cover means serving to prevent any material reclaimed by said rotating rotor means from falling over the upper edges thereof.

7. The combination described in claim 6 wherein said shelf members are spaced apart so as to form a horizontal slot type opening which is located over said conveying means, the bottom of said cargo hold being formed with a roof means over said shelf members and the horizontal opening and forming longitudinal tunnel, said plow means being adapted to be moved back and forth within said tunnel.

8. The combination described in claim 7 wherein said cargo hold is formed with a pair of spaced sidewalls coupled together by a pair of spaced end walls, one of said inclined shelf members being coupled to the lower edge of each of said sidewalls and extending substantially the entire length of said cargo hold, said roof means being spaced apart from each of said sidewalls so as to define the two parallel discharge openings.

References Cited

UNITED STATES PATENTS

| 1,778,533 | 10/1930 | Meyer | 214—15 |
| 1,942,839 | 1/1934 | Sheal et al. | 214—15 |
| 2,989,171 | 6/1961 | Lorenz | 214—17 X |

FOREIGN PATENTS

| 481,205 | 9/1929 | Germany. |

GERALD M. FORLENZA, Primary Examiner
FRANK E. WERNER, Assistant Examiner

U.S. Cl. X.R.

214—17